J. H. PRINTZ.
Non-Freezing Hydrants.

No. 130,069.  Patented July 30, 1872.

WITNESSES:  INVENTOR:

UNITED STATES PATENT OFFICE.

JOHN H. PRINTZ, OF ZANESVILLE, OHIO.

IMPROVEMENT IN NON-FREEZING HYDRANTS.

Specification forming part of Letters Patent No. 130,069, dated July 30, 1872.

*To all whom it may concern:*

Be it known that I, JOHN H. PRINTZ, of Zanesville, Muskingum county, State of Ohio, have invented a new and Improved Hydrant-Valve; and I declare the following to be a full, clear, and exact description of the same, such as will enable others skilled in the art to which it pertains to make and use it, reference being had to the accompanying drawing, which forms a part of this specification.

My invention relates to valves used in hydrants, so arranged as to form a continuous pipe to the spout when the valve is raised, but, when closed down again, admitting of the water above the valve expending itself through the valve at the bottom, so as to avoid freezing in winter.

Figure 1:
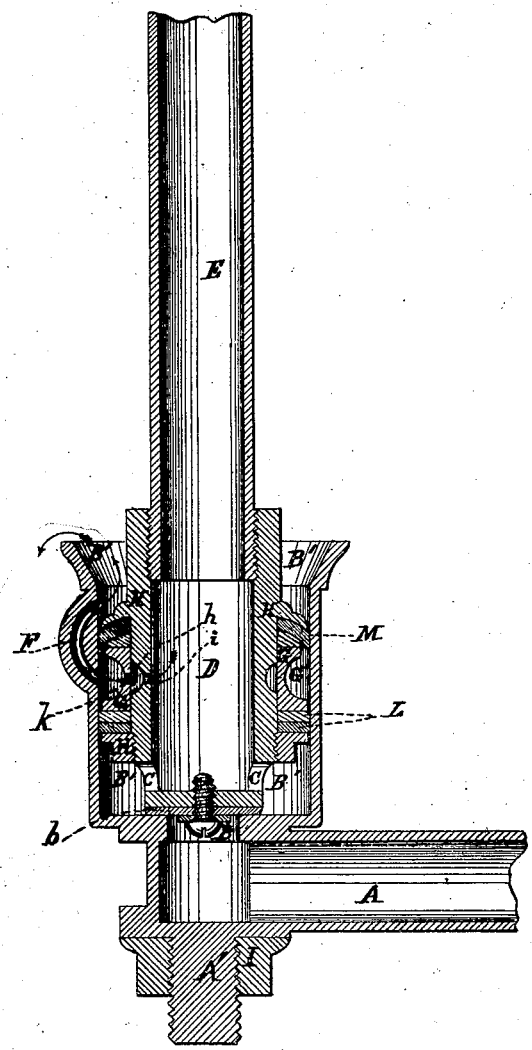
Figure 2:
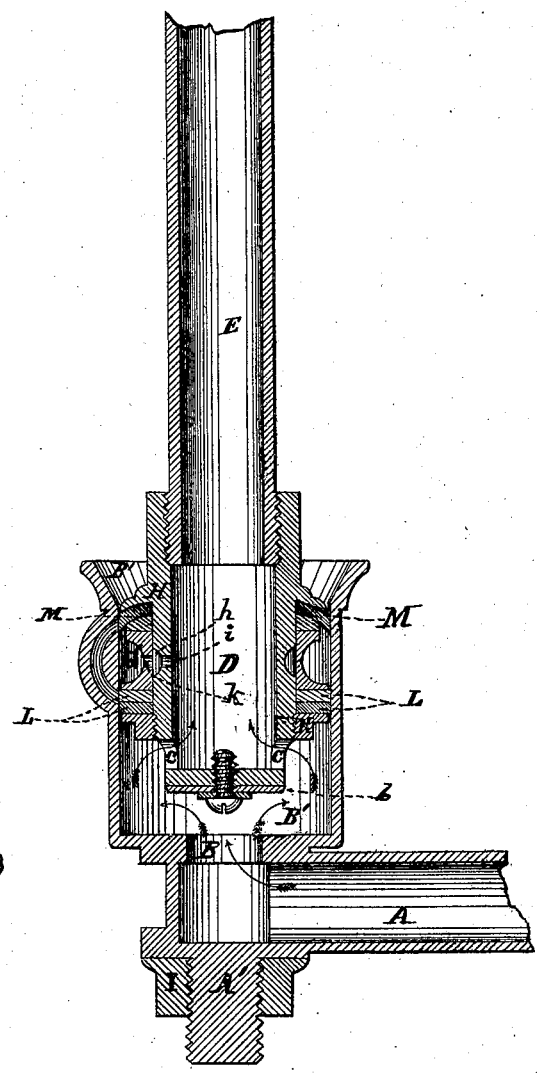

In the drawing, Figure 1 is a sectional view of the valve shut down, as it appears when the hydrant is not running. Fig. 2 is a sectional view of the valve when the hydrant is running.

A is the feed-pipe connection, through which water passes (Fig. 2) into the chamber B', through lateral holes or openings C, into cylinder D, and thence up through E to the hydrant-spout. When the stem E is pressed down again the leather disk $b$ closes down upon and shuts off the flow of water through the throat B, Fig. 1. When in this position the gaskets M and L are drawn away from the extremities of the duct F and the water in the tube E escapes through the opening $i$ into the annular groove $h$, thence through the opening $k$ into the annular groove G' and out of the duct F, and thus the water is brought down to a level with the top of the valve B'. When in the position shown in Fig. 2, at which time the water is flowing from the hydrant-spout, the gaskets L and bell-shaped gasket M cover the exit-duct F, and the water is prevented from leaking through. The gaskets L, being flat, serve as guides to keep the valve in its place, but soon wear so loose as not effectually to shut off the leakage through the duct F. I therefore add the bell-shaped valve M, which is made to project over the sides of the annular metallic ring G, and, by the pressure of the water from within the tube E, be shut square against the upper opening of the duct F, while the guides L are covering the lower opening of this duct. To construct this valve I form the carrier-piece H with orifices at the bottom $c\ c$, for the influx of the water, with a rabbet for the annular block G and the gaskets L and M. I also provide it with a waste-orifice, $i$, opening into an annular groove, $h$, so that, regardless of the relative positions of the openings $i$ and $k$, they will be connected by this annular groove. The cup-valve M is then placed in position, and a yielding washer may be placed beneath. The block G is then placed in position, one or more guide-washers, L, are placed beneath, and the whole brought firmly together by means of a follower, N. The block or annular ring G is provided with an annular groove, G', in order to form a connection between the opening K and duct F. This whole structure is terminated below in a bolt, A', and nut I, for attaching to a stay-plate.

Having thus fully described my invention, what I claim as new, and desire to secure by Letters Patent, is—

1. The carrier-pieces H, provided with the annular cup-shaped valves M, in combination with the outer casing, provided with the waste-wear F, when the two are combined in the manner and for the purpose set forth.

2. The combination of carrier-piece H, cup-valve M, annular grooved block G, guides L, follower N, and throttle-valve $b$ with the cup B' and waste-wear F or its equivalent, substantially as set forth and shown.

3. The curved waste-wear F, susceptible of being closed at both ends, substantially as shown and described.

JOHN H. PRINTZ.

Witnesses:
GEORGE W. PRINTZ,
A. J. ANDREWS.